United States Patent Office 3,124,561
Patented Mar. 10, 1964

3,124,561
POLYMERIZATION INITIATORS FOR POLAR MONOMERS
Lloyd T. Jenkins, Cary, N.C., assignor, by mesne assignments, to Monsanto Chemical Company, a corporation of Delaware
No Drawing. Filed Oct. 24, 1960, Ser. No. 64,312
10 Claims. (Cl. 260—88.7)

This invention relates generally to heterogeneous catalyst systems, and more particularly to novel catalysts of this type which are capable of initiating the polymerization of polar monomers, such as acrylonitrile.

In recent years the most significant development in the field of polymerization catalysts has been the utilization of complex compounds in heterogeneous polymerization systems. Perhaps, the best known among the catalyst systems of this type are those disclosed by Ziegler in German Patents 878,560 and 917,006 and U.S. Patent 2,781,410 wherein aluminum trialkyls complexed with metal halides are employed. These new catalyst systems which embody the principle of surface active initiators to synthesize polymer structures offer many advantages over the earlier redox or free radical type catalyst systems. Perhaps the foremost advantage is the provision of a capability for directing monomer additions to the polymer chain in an ordered fashion. Thus, it becomes possible to have some control over the ultimate polymer structure, which, of course, influences important polymer properties such as crystallinity, density and melting point.

Because of the great advantages which are realized in the use of these new catalyst systems, it is, of course, desirable that their applicability be as extensive as possible. However, inasmuch as is known, it has not been possible heretofore to prepare any non-hydrocarbon polymer with these interfacial type polymerization initiators.

Accordingly, it is a principle object of this invention to provide new complex catalyst systems which are capable of initiating the polymerization of polar monomers, such as acrylonitrile.

It is another object of this invention to provide a method for preparing the novel catalysts of this invention.

It is a further object of this invention to provide methods of polymerizing ethylenically unsaturated, polar monomers in the presence of the novel catalysts of the present invention.

Other objects of the invention will become apparent in the following description.

According to the present invention, the polymerization of polar monomers is carried out by contacting said monomers with a catalyst formed by reacting components comprising an organo-substituted phosphine, a co-complexing agent, e.g., dioxane and a metal halide.

Substituted phosphines which are useful as a catalyst component in the present invention are those of the formula $P(R)_3$ wherein R is a hydrocarbon radical which can be either alkyl, cycloalkyl, aryl or mixtures thereof. Particularly preferred phosphines include 3,3,5-trimethylcyclohexyl phosphine, trioctyl phosphine, diphenyl cyclohexyl phosphine, tributyl phosphine, trixylyl phosphine, triethyl phosphine, tridodecyl phosphine and trihexyl phosphine. The preferred phosphines are those wherein each alkyl, cycloalkyl, alkylcycloalkyl, aryl and alkylaryl radicals contain no more than 12 carbon atoms, and especially those which contain 9 carbon atoms or less.

The metal halide component of the catalyst systems of this invention are derived from refractory metals found in Groups IV–A, IV–B, V–A and V–B of the Mendeleev Periodic Table, and include metals, such as titanium, zirconium, hafnium, vanadium, niobium, tantalum, molybdenum, tin, lead and bismuth. Typical examples of metal halides which may be employed with satisfactory results include titanium tetrachloride, other titanium halides, such as titanium tetrabromide, titanium tetraiodide, titanium tetrafluoride; zirconium tetrachloride, and other zirconium halides; stannic chloride; bismuth trichloride; hafnium tetraiodide and the like. Among the suitable metal halides stannic chloride and titanium tetrachloride are especially preferred. Mixtures of two or more of the applicable metal halides can be employed if desired.

Briefly, the catalysts of this invention are prepared by first introducing the organo-substituted phosphine of choice into a reaction medium of dioxane. This is followed by adding the metal halide component to the mixture. A precipitate of metallic halide dioxante forms immediately and is permitted to dissolve back into the reaction vehicle, i.e., the dioxine, which is employed in excess of the amount which will enter into reaction. The resulting solution is allowed to stand for a period of time until a crystalline substance forms which constitutes the active catalyst complex. This product may be isolated from the reaction mass by filtration.

In preparing catalysts for use in this invention, all steps should be carried out in the absence of moisture, and preferably also in the absence of oxygen or other harmful impurities. This may be done conveniently by blanketing the materials with an inert gas, such as nitrogen. The raw materials should be purified to remove traces of moisture, oxygen and other impurities prior to use.

The proportions of the components used to prepare the catalyst may vary over a wide range of concentations. In fact, insofar as we have been able to determine, the proportions of the catalyst components are not believed to be critical. Typically the organo-substituted phosphine and the metal halide components may be used in respective molar proportions of from 10:1 to 1:10. Ordinarily, the preferred ratios range from about 5:1 to 1:5, and it has been found particularly advantageous to use molar ratios of about 1:1.

The order in which the organo-substituted phosphine and the metal halide are added to the dioxane is considered critical, i.e. the organo-substituted phosphine component is introduced first followed by the metal halide. It is usually necessary to add the metal halide ingredient slowly and with caution since there is a rapid, exothermic reaction with the dioxane forming a metallic-halide dioxanate.

It is not possible to state the exact composition of the complex catalysts which are prepared in the manner as just described. It is significant, however, that the resulting composition is catalytically distinct from any of the catalyst-forming starting ingredients when taken alone.

As has been noted, the catalysts provided by this invention are useful in initiating the polymerization of non-hydrocarbon or polar type monomers. Heretofore, such polymerizations were not amenable to initiation by interfacial type catalysis, and free-radical catalysis has been almost exclusively used. Among the polar monomers which can be catalyzed in polymerization reactions by the complex catalysts of this invention are methyl methacrylate, vinylidene chloride, vinyl acetate, N-vinylphthalimide, vinyl pyridine, acrylonitrile and other olefin containing polar monomers.

The initiators of this invention are especially useful when employed for inducing the polymerization of acrylonitrile. They are useful not only in producing the homopolymer but also a wide variety of copolymers. Among the olefinic monomers which may be polymerized with acrylonitrile while using the polymerization initiators of this invention are acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alphachloroacrylic acids; vinyl chloride, vinyl fluoride, vinyl bromide, vinylidene chloride, 1-chloro-1-bromoethylene; methacrylonitrile, acrylamide and methacrylamide; alpha-chloracrylamide, or monoalkyl substitution products thereof; methyl vinyl ketone, vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic ester; N-vinylcarbazole; vinyl furance; alkyl vinyl esters; vinyl sulfonic acid; ethylene alpha, beta discarboxylic acids or their anhydrides or derivatives, such as diethylcitraconate, diethylmesaconate, styrene, vinyl naphthalene; vinyl-substituted tertiary heterocyclic amines, such as vinyl pyridines, for example, 2-vinylpyridine, 4-vinylpyridine, 2-methyl-5 vinyl-pyridine, etc.; 1-vinylimidazole and alkyl-substituted 1-vinylimidazoles such as 2-, 4-, or 5 methyl-1-vinylimidazole and other olefin containing polymerizable material.

In effecting polymerization the initiators are contacted with the monomer or monomers in the liquid phase, and preferably in a solvent or reaction vehicle having a fairly high dielectric constant, i.e., in excess of 2.0 at 25° C. Suitable reaction vehicles that may be mentioned are water, chlorobenzene, methyl alcohol, dimethyl formamide, n-butyl alcohol, dioxane, ethylene glycol, monomethyl ether, diphenyl ether, tetrahydrofuran, acetone, benzene and isopropyl benzene among others. Water is particularly preferred because of its ready access and obvious economy. It has been found that the choice of solvent has an influence on the molecular weight of the ultimate polymer produced. Thus, for example, the highest molecular weight polymers were obtained when water was used as the reaction vehicle.

The polymerization process proceeds over a relatively wide temperature range with temperatures ranging from 0° C. to 250° C. being applicable, and particularly good results being obtained in the range of from about 40° C. to about 80° C. The pressure can be varied as desired with atmospheric pressures or even lower being applicable. In some instances it may be desirable to use superatmospheric pressures in order to increase the monomer concentration in contact with the catalyst. Although the polymerization pressure may be widely varied, pressures in the range of from atmospheric to 150 atmospheres absolute are generally used. The reaction time can be varied as desired from a period of a few minutes to a number of hours. When a batch process is employed, the reaction time normally used is from about 5 to 8 hours.

The quantity of catalyst employed can be varied over a wide range, and the amount needed to induce polymerization is not critical. However, it is generally advisable to employ more than trace amounts since there should at least be enough catalyst present to produce a reasonable rate of reaction.

The amount of vehicle or solvent employed can vary over wide limits in relation to the monomer-catalyst mixture, it being only necessary that sufficient monomer be in solution at any given time to effect reaction thereof. Generally speaking, when the monomer is in higher concentration, the rate of polymerization is increased. Following the polymerization reaction, the polymer can be separated from the catalyst solvent by any of several well known methods. One convenient method is to treat the reaction mixture with methanol or a methanol-acetone mixture followed by filtering and thereafter a drying operation.

To illustrate the manner in which the invention may be carried out in greater particularity, the following examples are given. It is to be understood, however, that the examples are for the purpose of illustration only, and the invention is not to be regarded as limited to any of the specific materials or conditions recited therein. Unless otherwise specified, parts disclosed in the examples are by weight.

*Example I*

A catalyst complex was prepared by adding one part of triphenyl phosphine to 25 parts of dioxane. To this solution there was cautiously added one part of bismuth trichloride. A precipitate formed instantly with the evolution of heat. The precipitate dissolved upon standing after which the resulting solution was permitted to stand for approximately 12 hours after which a crystalline complex formed. These crystals which constituted the active catalysts were isolated by filtration. This catalyst complex was then added to a 500 ml. round bottom flask containing 100 parts of water and 20 parts of redistilled acrylonitrile. External heat was applied to this mixture and the reaction which followed was allowed to run for 6 hours at an average temperature of about 66° C. The polymer formed was isolated with methanol and recovered by filtration. The yield of polyacrylonitrile was 5 grams.

*Example II*

When Example I is repeated except that trioctyl phosphine is substituted for the triphenyl phosphine, generally similar results are obtained.

*Example III*

When Example I is repeated except that 3,3,5-trimethylcyclohexyl phosphine is substituted for the triphenyl phosphine essentially the same results are obtained.

*Example IV*

When Example I is repeated except that stannic chloride is substituted for the bismuth trichloride substantially the same results are obtained.

The process of this invention may incorporate the use of antioxidants, dispersants and other modifying agents commonly used with polymer products.

The polymers produced in accordance with this invention have utility in all of the applications found for polymers of the corresponding types which are presently being manufactured, e.g. as fibers, films, sheets, coatings and molded articles.

It is not intended that the invention be limited to the above specific examples of materials and reaction conditions, but only by the appended claims in which it is intended to claim all novelty inherent in the invention as well as all modifications coming within the spirit and scope thereof.

What is claimed is:

1. A composition of matter suitable for use in initiating the polymerization of ethylenically unsaturated polar monomers which comprises the product obtained by first introducing an organo-substituted phosphine into a solution of dioxane followed by the addition thereto of a metal halide, said organo-substituted phosphine having the general formula $P(R)_3$ wherein R is a hydrocarbon radical containing from 1 to 12 carbon atoms selected from the group consisting of alkyl, cycloalkyl, alkylcycloalkyl, aryl, alkylaryl and mixtures thereof and said metal halide being derived from a metal selected from Groups IV-A, IV-B and V-B of the Mendeleev Periodic Table, and wherein said organo-substituted phosphine and said metallic halide are present in a molar ratio of from 1:10 to 10:1, permitting reaction to take place in an anhydrous and inert atmosphere, allowing crystals to form and settle out from the resulting reaction mixture and thereafter recovering the crystals from said reaction mixture.

2. The composition of claim 1, wherein said organo-substituted phosphine is triphenyl phosphine.

3. The composition of claim 1, wherein said organo-substituted phosphine is trioctyl phosphine.

4. The composition of claim 1, wherein said organo-substituted phosphine is 3,3,5-trimethylcyclohexyl phosphine.

5. The composition of claim 1, wherein said metal halide is bismuth trichloride.

6. The composition of claim 1, wherein said metal halide is stannic chloride.

7. A process for the polymerization of ethylenically unsaturated polar monomers which comprises reacting the same in a solvent having a dielectric constant in excess of 2.0 at 25° C., under inert conditions, at a temperature in the range of from 40° C. to about 80° C., at a pressure in the range of from 1 to 150 atmospheres absolute and in the presence of a catalytic amount of a catalyst obtained by first introducing an organo-substituted phosphine into a solution of dioxane followed by the addition thereto of a metal halide, said organo-substituted phosphine having the general formula $P(R)_3$ wherein R is a hydrocarbon radical containing from 1 to 12 carbon atoms selected from the group consisting of alkyl, cycloalkyl, alkylcycloalkyl, aryl, alkylaryl and mixtures thereof and said metal halide being derived from a metal selected from Groups IV-A, IV-B and V-B of the Mendeleev Periodic Table, and wherein said organo-substituted phosphine and said metallic halide are present in a molar ratio of from 1:10 to 10:1, permitting reaction to take place in an anhydrous and inert atmosphere, allowing crystals to form and settle out from the resulting reaction mixture and thereafter recovering the crystals from said reaction mixture.

8. The process of claim 7 wherein said organo-substituted phosphine compound and said metal halide are present in a molar ratio of from 1:10 to 10:1.

9. The process of claim 7 wherein said organo-substituted phosphine and said metal halide are present in a molar ratio of 1:1.

10. The process of claim 7 wherein said polar monomer is acrylonitrile.

References Cited in the file of this patent

UNITED STATES PATENTS

| | | |
|---|---|---|
| 2,608,554 | Bullitt | Aug. 26, 1952 |
| 2,832,759 | Nowlin et al. | Apr. 29, 1958 |
| 2,927,086 | Gordon et al. | Mar. 1, 1960 |
| 2,961,433 | Linn | Nov. 22, 1960 |
| 3,050,470 | Pearson et al. | Aug. 21, 1962 |
| 3,050,471 | Anderson et al. | Aug. 21, 1962 |

FOREIGN PATENTS

| | | |
|---|---|---|
| 832,319 | Great Britain | Apr. 26, 1960 |
| 833,579 | Great Britain | Apr. 27, 1960 |